H. T. BURKEY.
ELECTRIC FISH STOP.
APPLICATION FILED SEPT. 28, 1917.
1,269,380.
Patented June 11, 1918.
2 SHEETS—SHEET 1.
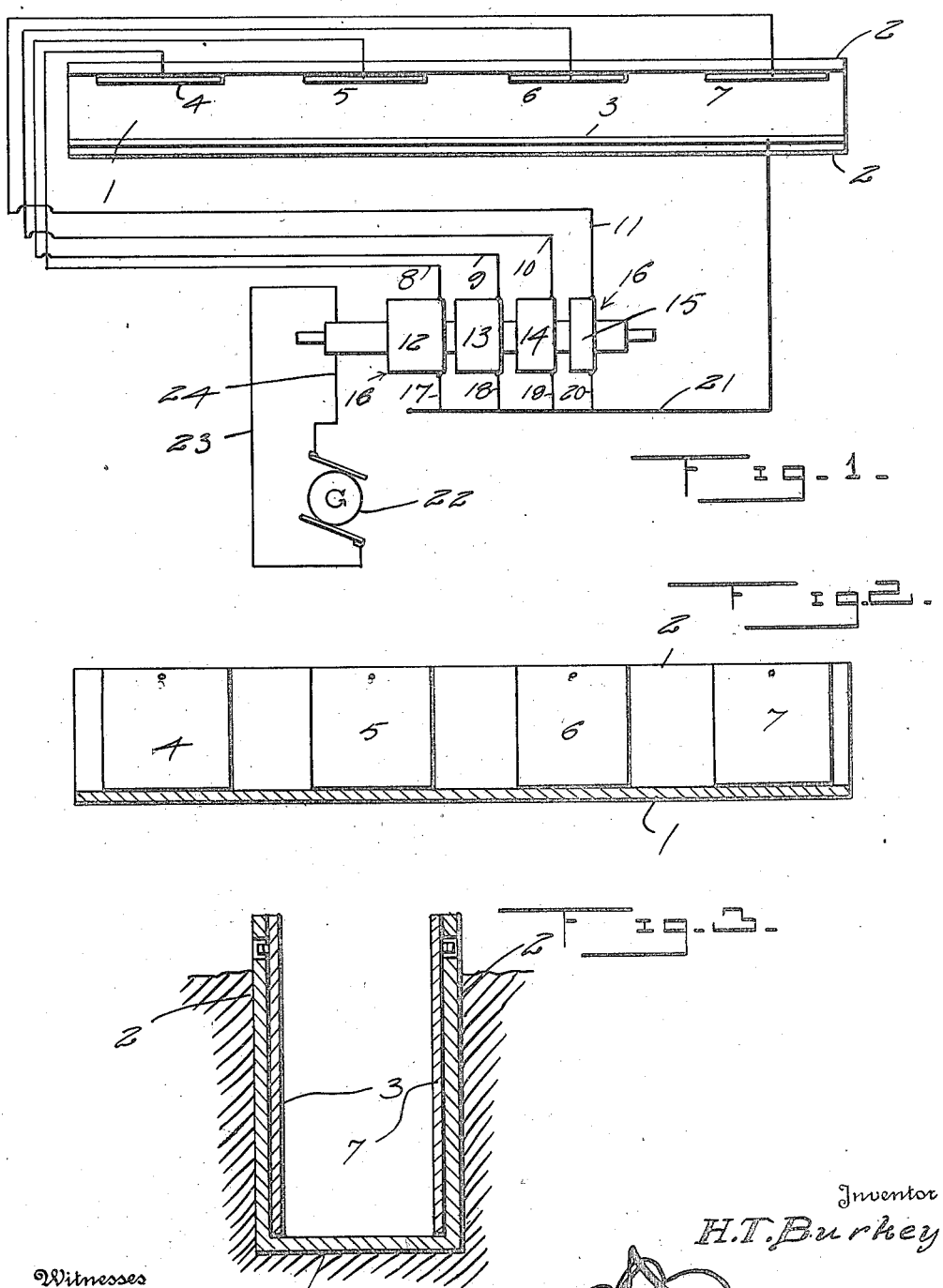

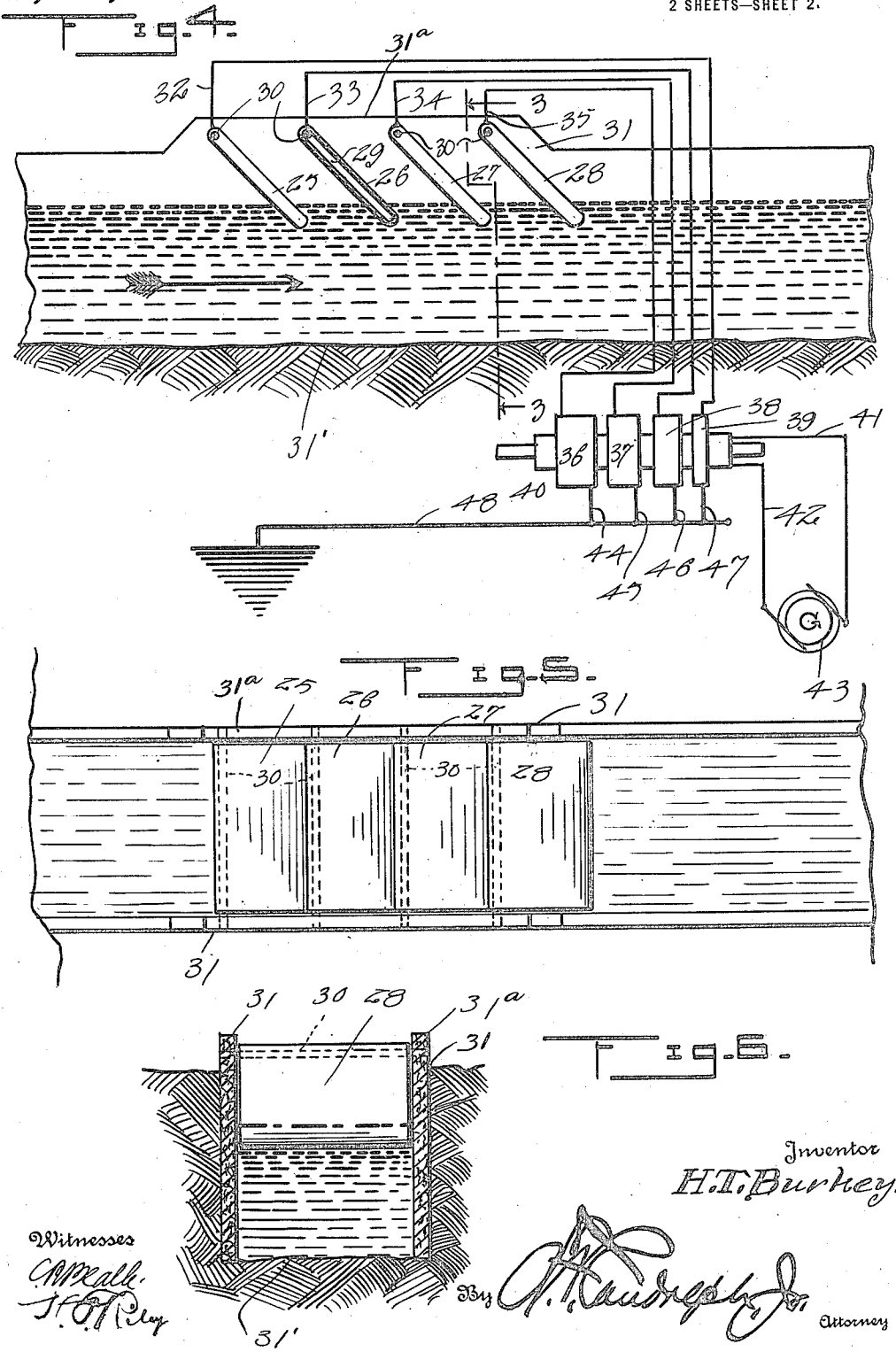

UNITED STATES PATENT OFFICE.

HENRY T. BURKEY, OF TULSA, OKLAHOMA.

ELECTRIC FISH-STOP.

1,269,380.

Specification of Letters Patent.

Patented June 11, 1918.

Application filed September 28, 1917. Serial No. 193,800.

*To all whom it may concern:*

Be it known that I, HENRY T. BURKEY, a citizen of the United States, residing at Tulsa, in the county of Tulsa and State of Oklahoma, have invented certain new and useful Improvements in Electric Fish-Stops; and I do hereby declare the following to be a full, clear, and exact description of the invention, such as will enable others skilled in the art to which it appertains to make and use the same.

The invention relates to an electric fish stop.

The object of the present invention is to provide a simple, practical and efficient electric fish stop designed for use in irrigating ditches and analogous places and capable of electrifying the water with gradually increasing intensity, whereby fish of all sizes found in such places will be turned back without liability of killing the smaller fish by subjecting the same to a sudden charge of an excessively heavy current.

With these and other objects in view, the invention consists in the construction and novel combination of parts hereinafter fully described, illustrated in the accompanying drawing and pointed out in the claims hereto appended; it being understood that various changes in the form, proportion, size and minor details of construction, within the scope of the claims, may be resorted to without departing from the spirit or sacrificing any of the advantages of the invention.

In the drawing:

Figure 1 is a plan view of an electric fish stop constructed in accordance with this invention.

Fig. 2 is a sectional view taken longitudinally of the trough.

Fig. 3 is a sectional view taken transversely of the trough.

Fig. 4 is a plan view of a fish stop showing another form of the invention.

Fig. 5 is a longitudinal sectional view of the same.

Fig. 6 is a transverse sectional view of the fish stop shown in Fig. 4.

Like numerals of reference designate corresponding parts in all the figures of the drawing.

In the accompanying drawing, in which is illustrated the preferred embodiment of the invention, the electric fish stop comprises in its construction a trough 1 designed to be constructed of wood or any other suitable material and composed of a bottom and side walls and arranged within an irrigation ditch 2, but the apparatus may be used in any similar place for preventing fish from passing from a reservoir or other point through ditches or the like leading therefrom. The trough may be of any desired dimensions and it is equipped at one of its side walls at the inner face thereof with a continuous electrode 3 consisting preferably of a rectangular copper plate which is designed to extend from one end of the trough to the other and from the bottom of the same to the upper edge of the said side walls. The trough is equipped at the opposite side with a plurality of electrodes 4, 5, 6 and 7 arranged in spaced relation and extending from the bottom of the trough to the upper edge of the side upon which they are mounted. While copper is preferably employed in the construction of the plates or electrodes they may be of any other suitable conducting material.

The spaced series of electrodes 4, 5, 6 and 7 are connected by wires 8, 9, 10 and 11 with portions or units 12, 13, 14 and 15 of a transformer 16 of any desired construction. The portions 12, 13, 14 and 15 of the transformer are also connected by wires 17, 18, 19 and 20 with a conductor wire 21 leading to and connected with the continuous electrode. The transformer is also connected with a generator 22 or other source of electric current supply by feed wires 23 and 24, and the generator may be conveniently operated by water power or any other suitable means as will be readily understood.

The portions of the transformer, which are connected with the members of the series of electrodes, are designed to step down the current from the generator or the source of supply to a current say of twenty-five volts, seventy-five volts, one hundred and twenty-five volts and two hundred volts, the current at the mouth or entrance of the trough being designed to be twenty-five volts and gradually increasing in voltage to the rear or outlet end. It has been found by practice that fish are exceedingly sensitive to electricity in water and will be turned back by a current of sufficient power to affect them. In order to prevent injury to small fish the current passing from the electrodes 4, 5, 6 and 7 to the main electrode 3 is weakest at the entrance so that small fish will be turned back without liability of killing the same and while the current at the entrance may not be sufficient to stop larger fish, the latter will be stopped by the increasing current before they pass through the trough. In this manner the fish will be effectively prevented from passing through the trough and injury to small fish will be eliminated. The apparatus is adapted to maintain a steady flow of current across the trough and the strength of the current may of course be varied to suit the size of the electrodes and the distance between the same and the various other conditions incident to the installation of the apparatus in an irrigating ditch or other water passage where it is desired to prevent the fish from passing through the same with the water. It is designed to use an alternating current of high power at the source, and while the series of electrodes are shown consisting of four any number may of course be included in the series and the members may be of any desired size.

In Figs. 4 to 6 inclusive of the drawings is illustrated another form of the invention in which buoyant electrodes 25, 26, 27 and 28 are employed. The buoyant electrodes, which are constructed of copper or other suitable conducting material, are hollow to provide air chambers 29 and they are pivoted or hinged at 30 to opposite supports 31 preferably consisting of marble slabs or other suitable insulating material to prevent the electric current from passing into the banks at opposite sides of the ditch or stream. The hollow buoyant electrodes, which are adapted to rise and fall with the water, float substantially upon the surface of the same and the current will pass through the electrodes and through the water to the bottom of the stream or ditch. The side supports are preferably provided with extensions 31ᵃ to receive the pivots of the electrodes and wires 32, 33, 34 and 35, which extend from the said pivots, connect electrodes with units 36, 37, 38 and 39 of a transformer 40 constructed similar to that heretofore described and connected by wires 41 and 42 with a suitable generator 43. The units of the transformer are also connected by wires 44, 45, 46 and 47 with a common ground wire 48 to complete the circuit in which the electrodes are arranged. The electrodes are adapted to electrify the water passing along the ditch or stream with increasing intensity so as to effectively stop large and small fish without liability of injuring the same. Various other means may of course be employed for electrifying the water to provide a fish stop of the character described. The electrodes are preferably of a length to extend entirely across the ditch or stream. Other forms of electrodes may be employed and perforated metal or screen electrodes have been found efficient for this purpose. When perforated metal or screen are employed for pivoted electrodes, any suitable form of float such as wood or a hollow cylinder or the like may be used.

What is claimed is:

1. An electric fish stop of the class described including means for electrifying the water of a stream or ditch at a sectional portion of the same to prevent fish from passing the fish stop, said means including a plurality of electrodes arranged at intervals, and means for producing electric currents of progressively increasing strength through the water.

2. An electric fish stop of the class described including means for electrifying the water of a stream or ditch at a sectional portion of the same to prevent fish from passing the fish stop, said means including a plurality of electrodes arranged at intervals, a transformer connected with the electrodes for producing currents increasing in voltage from one end of the series of electrodes to the other, and means for supplying the transformer with a current of relatively high power.

3. An electric fish stop of the class described including means for electrifying the water of a stream or ditch at a section or portion of the same to prevent fish from passing the fish stop.

4. An electric fish stop of the class described including means for electrifying the water of a stream or ditch with progressively increasing currents to prevent fish from passing the fish stop.

5. An electric fish stop of the class described including a pivotally mounted buoyant electrode arranged to rise and fall with the water and adapted to electrify the water of a stream or ditch to prevent fish from passing along the same.

6. An electric fish stop of the class described including a plurality of pivotally mounted electrodes arranged at intervals along a ditch or stream and adapted to electrify the water passing along the same with increasing intensity.

7. An electric fish stop of the class described including a plurality of pivotally mounted electrodes arranged at intervals along a ditch or stream and adapted to electrify the water passing along the same with increasing intensity, said electrodes being hollow to form air chambers for rendering the electrodes buoyant to enable the same to rise and fall with the water and adapted to cause currents of electricity to pass through the water from the surface to the bottom of the same.

8. An electric fish stop of the class described including a plurality of pivotally mounted electrodes arranged at intervals along a ditch or stream and adapted to electrify the water passing along the same with increasing intensity, said electrodes being hollow to form air chambers for rendering the electrodes buoyant to enable the same to rise and fall with the water and adapted to cause currents of electricity to pass through the water from the surface to the bottom of the same, a transformer having units connected with the electrodes, and a generator connected with the transformer.

In testimony whereof I affix my signature in presence of two witnesses.

HENRY T. BURKEY.

Witnesses:
   W. C. RAPRIGHT,
   G. BARRINGER.